(12) United States Patent
O'Rear et al.

(10) Patent No.: US 7,906,177 B2
(45) Date of Patent: Mar. 15, 2011

(54) METHOD FOR MAKING AN ARTICLE HYDROPHOBIC AND OLEOPHOBIC AS WELL AS ARTICLES MADE THEREFROM AND THEIR USE

(75) Inventors: Edgar A. O'Rear, Norman, OK (US); Nantaya Yanumet, Bongkok (TH)

(73) Assignee: The Board of Regents of the University of Oklahoma, Norman, OK (US)

( * ) Notice: Subject to any disclaimer, the term of this patent is extended or adjusted under 35 U.S.C. 154(b) by 0 days.

(21) Appl. No.: 11/317,036

(22) Filed: Dec. 22, 2005

(65) Prior Publication Data
US 2007/0149075 A1 Jun. 28, 2007

Related U.S. Application Data

(60) Provisional application No. 60/638,861, filed on Dec. 22, 2004.

(51) Int. Cl.
*B05D 3/10* (2006.01)
(52) U.S. Cl. ......... 427/342; 427/337; 427/340; 427/384; 427/385.5; 427/389.9; 427/391; 427/392; 427/393.4; 427/394; 427/395; 427/396
(58) Field of Classification Search .................. None
See application file for complete search history.

(56) References Cited

U.S. PATENT DOCUMENTS

| | | | | |
|---|---|---|---|---|
| 3,282,905 A | * | 11/1966 | Raynolds et al. | 526/245 |
| 3,645,989 A | * | 2/1972 | Tandy | 526/245 |
| 3,838,083 A | | 9/1974 | Ukihashi et al. | |
| 5,623,015 A | * | 4/1997 | Diehl et al. | 524/555 |
| 2002/0182329 A1 | | 12/2002 | O'Rear et al. | |
| 2005/0038154 A1 | * | 2/2005 | Von Schmittou et al. | 524/284 |
| 2005/0042467 A1 | | 2/2005 | O'Rear et al. | |

FOREIGN PATENT DOCUMENTS

GB 1040035 * 8/1966

OTHER PUBLICATIONS

CAS Registry file of RN 2997-92-4, entered STN Nov. 16, 1984.*
PCT/US205/046850, Int'l Search Report, Sep. 19, 2006.
In Jun Park, Soo-Bok Lee, Chang Kyun Choi "Surface Properties for Poly (perfluoroalkylethyl methylacrylate)/ Poly (n-alkyl methacrylate)s Mixtures" Journal of Applied Polymer Science, vol. 54, 1994, pp. 1449-1454.
B. Methachan, T. Pongprayoon, N. Yanumet and E. A. O'Rear, "Formation of Hydrophobic Cotton Fabric by Admicellar Polymerization," *AATCC Reviews* 2: 53-59, 2002.
Duc Le, Melissa Rieger-Kendrick and E. A. O'Rear, "Admicellar Polymerization and Characterization of Thin Poly(2,2,2-Trifluorethyl Acrylate) Film over Aluminum Alloys for In-Crevice Corrosion Control" *Langmuir* 20(18): 7802-10, 2004.

(Continued)

*Primary Examiner* — Erma Cameron
(74) *Attorney, Agent, or Firm* — Hall Estill Hardwick Gable Golden & Nelson, P.C.

(57) ABSTRACT

The present invention relates in general to a method and variations thereof for making an article, such as cloth, water repellent and/or water resistant (i.e. hydrophobic) as well as oil repellent (i.e. oleophobic). In particular, the method involves the process of providing a thin-layer polymer coating on the article thereby rendering the article water repellent and/or water resistant. Articles made according to the method of the present invention are also disclosed and claimed herein as are the treated articles' use.

20 Claims, 8 Drawing Sheets

OTHER PUBLICATIONS

T. Pongprayoon, N. Yanumet and E. A. O'Rear, "Admicellar Polymerization of Styrene on Cotton" *J. Colloid Interf. Sci.* 249: 227-234, 2002.

T. Pongprayoon, Edgar A. O'Rear, N. Yanumet and W.-L. Yuan, "Wettability of Cotton Modified by Admicellar Polymerization," *Langmuir* 19: 3770-3778, 2003.

S. Boufi, and A. Gandini, "Formation of polymeric films on cellulosic surfaces by admicellar polymerization," *Cellulose* 8 (4): 303-312, 2001.

Thirawudth Pongprayoon, Nantaya Yanumet, Edgar A. O'Rear, Walter E. Alvarez and Daneil E. Resasco, "Surface Characterization of Cotton Coated by a Thin Film of Polystyrene With and Without a Crosslinking Agent," *J. Coll. Interface Sci.* 281: 307-315, 2005.

* cited by examiner

Adsorption Isotherm of Surfactant

FMA:DBSA ratio = 10:1
(Adapted process)
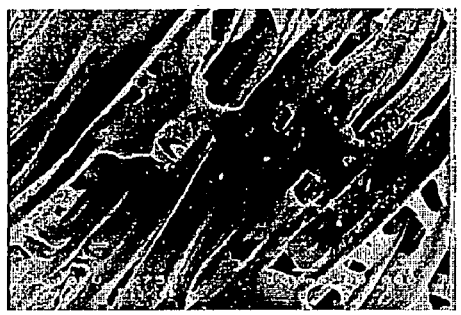
FMA:DBSA ratio = 10:1
(Standard process)
FMA:DBSA ratio = 10:1
(Solution polymerization)
FIG. 6 (1 of 3)

Untreated cotton
FMA:DBSA ratio = 2:1
(Adapted process)
FMA:DBSA ratio = 4:1
(Adapted process)
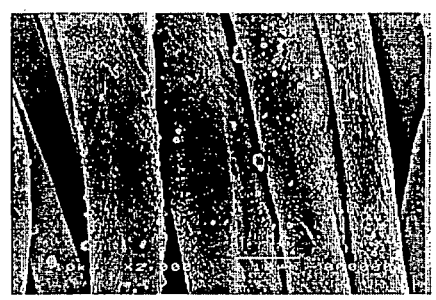
FMA:DBSA ratio = 2:1
(Standard process)
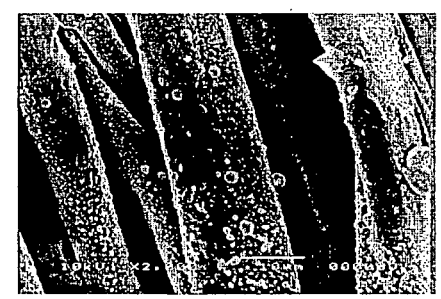
FMA:DBSA ratio = 4:1
(Standard process)
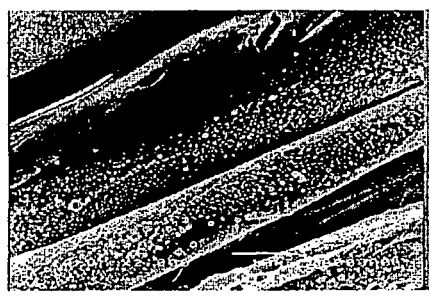
FMA:DBSA ratio = 2:1
(Solution polymerization)
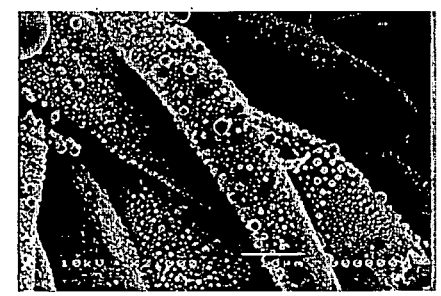
FMA:DBSA ratio = 4:1
(Solution polymerization)
FIG. 6 (2 of 3)

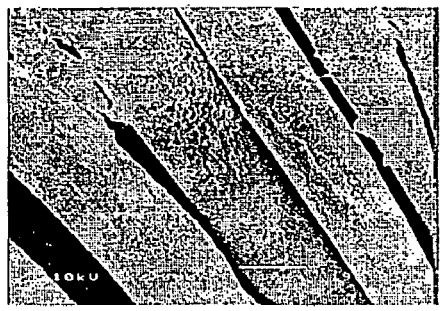
FMA:DBSA ratio = 6:1
(Adapted process)
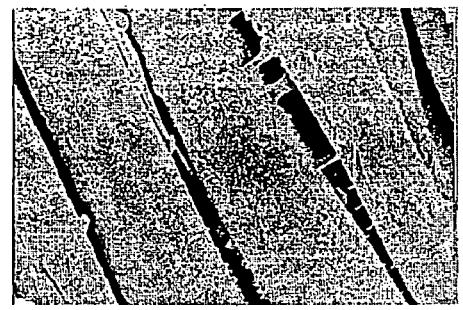
FMA:DBSA ratio = 8:1
(Adapted process)
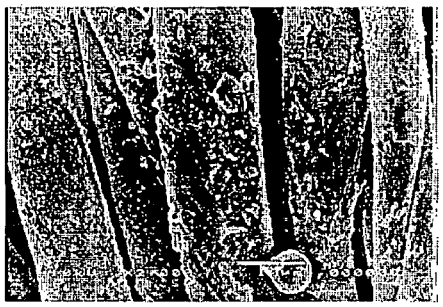
FMA:DBSA ratio = 6:1
(Standard process)
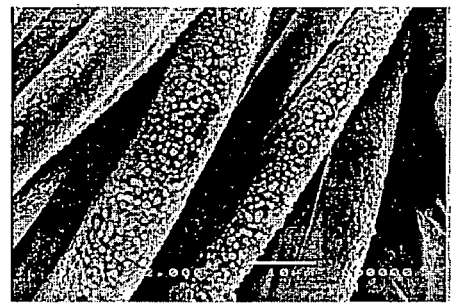
FMA:DBSA ratio = 8:1
(Standard process)
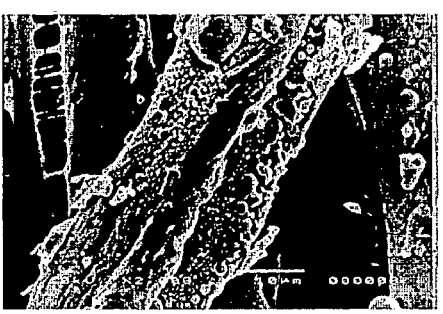
FMA:DBSA ratio = 6:1
(Solution polymerization)
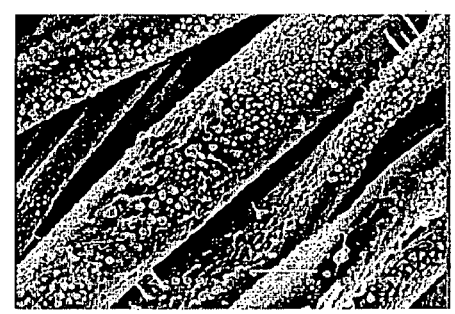
FMA:DBSA ratio = 8:1
(Solution polymerization)
FIG. 6 (3 of 3)

US 7,906,177 B2

METHOD FOR MAKING AN ARTICLE HYDROPHOBIC AND OLEOPHOBIC AS WELL AS ARTICLES MADE THEREFROM AND THEIR USE

CROSS-REFERENCE TO RELATED APPLICATIONS

This application claims the benefit under 35 U.S.C. 119(e) of U.S. Provisional Application Ser. No. 60/638,861, filed Dec. 22, 2004.

STATEMENT REGARDING FEDERALLY SPONSORED RESEARCH OR DEVELOPMENT

Not Applicable.

BACKGROUND OF THE INVENTION

In as much as additional references, articles, journals and the like are mentioned or cited herein, each such item is expressly incorporated herein by reference in its entirety as if it were set forth herein explicitly.

1. Field of the Invention

The present invention relates in general to a method and variations thereof for making an article, such as cloth, water repellent and/or water resistant (i.e. hydrophobic) as well as oil repellent (i.e. oleophobic). In particular, the method involves the process of providing a thin-layer polymer coating on the article thereby rendering the article water repellent and/or water resistant. Articles made according to the method of the present invention are also disclosed and claimed herein as are the treated articles use.

2. Brief Description of the Related Art

The formation of thin films on solid surfaces has been the subject of many studies by persons of ordinary skill in the art because of the wide variety of differing films and their individual and unique applications. The preparation of very thin polymer films in adsorbed surfactant bilayers has also been under study, but the results of such studies have oftentimes been inconclusive or unsatisfactory.

Thin film polymerization is carried out in a multi-step process based on the formation of micelle-like aggregates of physically adsorbed surfactants at a solid-solution interface. Such surface aggregates are termed admicelles or hemimicelles. Polymerization of monomers adsolubilized in the admicelles leads to the formation of a thin film on the solid substrate. This technique, which is called admicellar polymerization, is quite versatile and is applicable to a variety of surfaces. Various potential applications have been proposed for thin films formed by this technique such as in the microelectronic industry, particularly for the manufacture of miniaturized circuit patterns on silicon wafers. Other uses include solid lubrication, corrosion inhibition, optical coatings, and surface-modified electrodes.

The present invention is generally directed to a method for producing a hydrophobic and oleophobic article (such as wool or cotton fabric) wherein this hydrophobic and oleophobic article includes a surface coated with a very thin film of fluroalkyl polymer, such as Poly (perfluoroalkylethyl methacrylate) ("PFMA") using a unique admicellar polymerization methodology. By using such a methodology, the hydrophobic and oleophobic article retains air permeability thereby allowing for production of an article, such as a wool or cotton fabric, that can be used to produce water and oil repellent garments which are also comfortable to wear and easy to maintain/clean.

Production of water and oil repellent textiles has developed from a traditional art to a highly specialized branch of technology during the past century. In the case of cotton, which is a hydrophilic fiber, water repellency is generally imparted by treating the surface of the fabric with a hydrophobic material. Examples of hydrophobic materials used includes wax, silicone, and fluorochemicals. Such a treatment usually involves the pad-and-dry process. To improve the breathability of the fabric, Formasa Taffeta Co. Ltd. in Taiwan developed a process employing a porous polyurethane coating to allow air and moisture to pass through the coated fabric. This water-repellent cotton had good air permeability due to the coating of a porous resin on the fabric with specially designed, tightly woven, cloth construction. However, this process resulted in a fabric which was much thicker and heavier than the original fabric. The present invention offers a new method for coating a thin film on an article or substrate, such as cotton or wool, which provides a water and oil repellant and/or water or oil resistant fabric that is easily handled and has superior air permeability without creating a thicker than original substrate or article—for example; a cotton or wool textile.

The effects of counterion on surfactant adsorption are known in the art. It has been shown that the counterion giving the highest adsorption of surfactant, at a given surfactant and added electrolyte concentration, depends on both pH and fractional surface coverage. The results have suggested that any Region II/Region III transition in the adsorption of surfactant does not occur near the completion of the monolayer coverage nor as a result of electrostatic repulsion of surfactant ions from the mineral surface due to reversal of the net surface charge.

Wu et al. coated polystyrene on alumina surface by using sodium dodecyl sulfate (SDS) as the surfactant in a water/ethanol solution. The treated alumina was analyzed in two parts. The first part was analysis by FTIR (KBr pellets) and the other one was extraction by tetrahydrofuran (THF) and analyzed analysis by UV spectrophotometer. The results confirmed that admicellar polymerization occurred. Wu et al. also found that the polymerization of styrene in the admicelle followed the case IB model in the Smith-Ewart theory. After that, Wu et al. characterized the alumina surface coated with polystyrene. Film thickness ranged from 1.8 to 0.4 nm while BET (a popular nitrogen adsorption technique to determine surface area developed by Brunauer, Emmett, and Teller) surface area decreased from 94.7 to 57.8 $m^2/g$. The alumina surface changed from hydrophilic to hydrophobic while retaining the basic pore structure.

Esumi et al. studied polymerization on alumina powder by using sodium 10-undecenoate, which is a polymerizable surfactant. Esumi et al. formed a bilayer of surfactant and polymerized this layer through UV radiation. The dispersion of the alumina particles was studied by looking at mean particle size. Because hydrophilic groups of the surfactant in the second layer were in contact with the aqueous solution, the alumina particles were dispersed due to electrostatic repulsion. The results also showed that purging with nitrogen gas enhanced polymerization.

The incorporation of alcohols into admicelles is also known in the art. It has been found that the surfactant adsorption over most of the isotherm is enhanced dramatically by the presence of alcohol. As the chain length of alcohol is increased, the surfactant adsorption at regions of lower surfactant adsorption was enhanced. A two-site adsolubilization model has been proposed to interpret this complicated system. One of the alcohol sites was the same as in micelles, at the region between the headgroups of the surfactant. The other was a site not present in micelles, the hydrophobic perimeter arising from patchwise adsorption of the disk-shaped admicelle. This model was used to explain: (i) very high ratios of alcohol to surfactant adsorption at lower coverage, (ii) increase of surfactant adsorption below the CMC, and (iii) a slight decrease of plateau adsorption.

Coated polystyrene on precipitated silica is also known in the art. Several types of surfactants consisting of cationic surfactant cetyl trimethylammonium bromide (CTAB), non-ionic surfactant (MACOL®, a brand of nonionic surfactants produced by BASF, The Chemical Company), and water-insoluble surfactant (ADOGEN, commercial cationic surfactants) have been used. Two kinds of polymerization were tested: First, thermal polymerization, and secondly, REDOX (oxidation-reduction) polymerization. Due to the effect of head group packing density and length of alkyl chain, the results showed that CTAB adsorbed less than SDS and ADOGEN but greater than MACOL on this substrate. When using azobisisobutyronitrile (AIBN) as an initiator, the ratio of initiator to monomer was necessarily high. It has been proposed that the ethanol used to dissolve AIBN consumed many of the radicals formed. For the REDOX system, as the ratio was lower, the reaction took longer to complete. The reduction in the molecular weight of the extractable polymer, as well as the increase in dispersity, was expected. As the chain length of the polymer increases it become more entangled in the surface and more difficult to extract.

Formation of polytetrafluoroethylene (PTFE) on aluminum oxide by admicellar polymerization is also known in the art. In these experiments, ammonium persulfate was used as the initiator. Sodium bisulfate ($NaHSO_4$) and ferrous sulfate ($FeSO_4$) were used as initiator regulators thereby improving the initiator effectiveness at low temperature. The results showed that pressure was the main factor in the control of adsolubilization of the gaseous monomer tetrafluoroethylene into surfactant bilayers. The concentration of the initiator also affected polymerization indicating the analysis of kinetic data must take into account such as the concentration of the initiator. Polytetrafluoroethylene was successfully coated on both aluminum oxide powder and chips. Frictional behavior seemed to be related with film thickness and continuity.

The formation of thin polystyrene films on glass fiber surface has been attempted and is known in the art as well. These experiments used the cationic surfactants dodecyl trimethylammonium bromide (DTAB) and cetylpyridinium chloride (CPC). The concentration of styrene used and testing method of treated fiber were tested the same as in the work of Wu et al., except that treated fiber was examined by a scanning electron microscope (SEM). The results showed that polystyrene can be coated on glass fiber surface but the SEM micrographs revealed a nonuniform coating on the surface. These experiments showed that polymerization was not restricted to the admicelles and that some polymerization occurred in the supernatant.

SUMMARY OF THE INVENTION

The present invention discloses and claims a method for providing a sheet of material having a hydrophobic and oleophobic polymer coating on at least one surface thereof. In one embodiment, the method comprises the following steps: (1) providing a sheet of material having a first surface and a second surface and possibly the sheet of material may also have a plurality of porous internal surfaces; (2) providing an aqueous hydrophobic and oleophobic coating composition containing a surfactant and a monomer of a hydrophobic and oleophobic polymer providing an initiator; (3) coating at least one of the first and second surfaces of the sheet of material with the aqueous hydrophobic and oleophobic coating composition; (4) introducing the initiator into the hydrophobic and oleophobic coating composition disposed on at least one of the first and second surfaces of the sheet of material; and (5) initiating a reaction on the sheet of material coated with the aqueous hydrophobic and oleophobic coating composition and the initiator for a predetermined period of time such that a hydrophobic and oleophobic polymer coating forms on at least one surface of the sheet of material.

In a preferred embodiment, the sheet of material is selected from the group consisting of cloth, wool, burlap, natural and synthetic polymer films, polyesters, paper, cardboard and combinations thereof. In this embodiment and/or other embodiments, the surfactant is selected from the group consisting of fluoralkyl compounds. In this same embodiment and/or other embodiments the initiator may be either 2,2'-Azobis (2-methylpropionamidine) dihydrochloride, sodium persulfate, or AIBN and it may be introduced concurrently with the surfactant and monomer or at any later stage. Additionally, the initiation may include heat, alone or in combination with any additional compound, as well as any other polymer initiating methodology or technology, such as sonic waves, IR and UV radiation, etc.

BRIEF DESCRIPTION OF THE SEVERAL VIEWS OF THE DRAWINGS

FIG. 6 is a panel of SEM micrographs showing fiber surfaces treated according to the methodology of the presently claimed and disclosed invention.

DETAILED DESCRIPTION OF THE INVENTION

Figure 1:
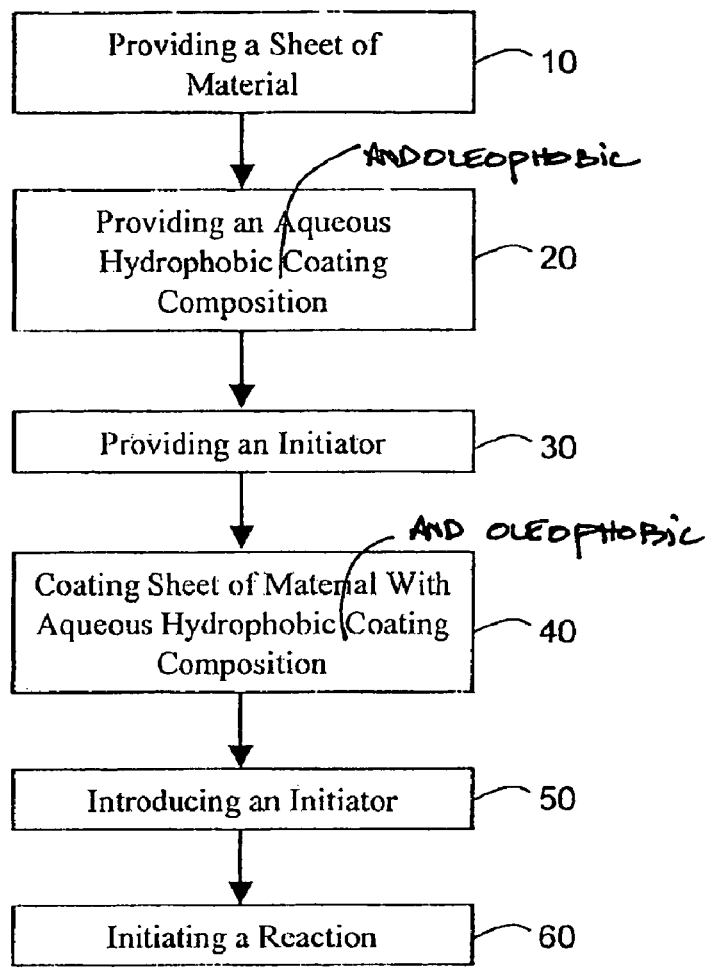
FIG. 1 is a schematic flow diagram view of the methodology of the present invention.

Before explaining in detail at least one embodiment of the invention in detail by way of exemplary drawings experimentation and results, it is to be understood that the invention is not limited in its application to the details of construction and the arrangement of the components set forth in the following description, experimental results, or illustrated in the drawings. The invention is capable of other embodiments or of being practiced or carried out in various ways. Also, it is to be understood that the phraseology and terminology employed herein is for purpose of description and should not be regarded as limiting.

The present invention encompasses a method for making an article, such as cloth, water repellent and/or waterproof. In general, the method includes the following steps (shown generally in FIG. 1): (1) providing 10 a sheet of material having a first surface and a second surface; (2) providing 20 an aqueous hydrophobic and oleophobic coating composition containing a surfactant and at least one monomer of a hydrophobic and oleophobic polymer (such as PFMA); (3) providing 30 an initiator; (4) coating 40 at least one of the first and second surfaces of the sheet of material with the aqueous hydrophobic and oleophobic coating composition; (5) introducing 50 the initiator into the hydrophobic and oleophobic coating composition disposed on at least one of the first and second surfaces of the sheet of material; and (6) initiating 60 a reaction on the sheet of material coated with the aqueous hydrophobic and oleophobic coating composition and the initiator for a predetermined period of time such that a hydrophobic and oleophobic polymer coating forms on at least one surface of the sheet of material.

Figure 2:
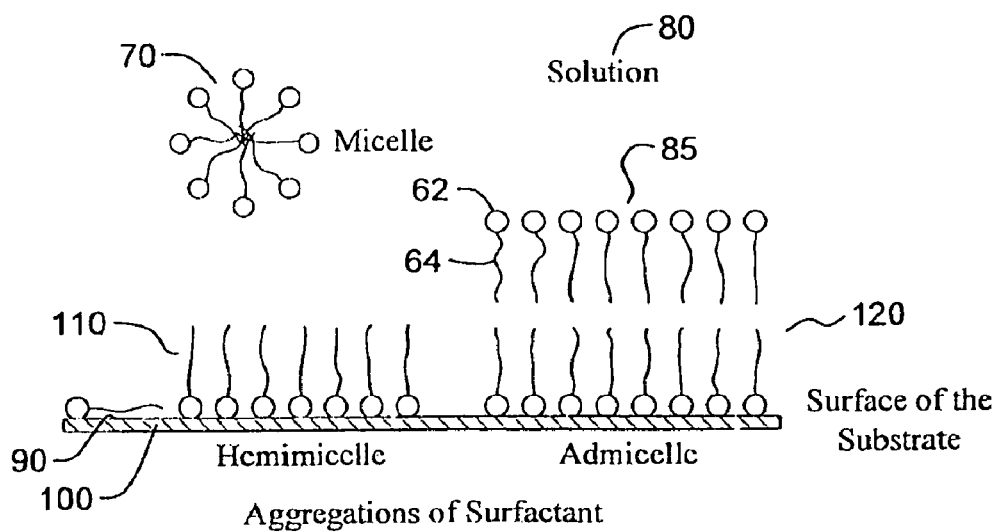
FIG. 2 is a representative view of aggregations of surfactant on a surface.

Surfactants are substances that are widely used for cleaning, enhanced oil recovery, construction, and pharmaceutical formulations. Surfactants tend to migrate to interfaces or form structures to create new molecular surfaces. A surfactant molecule consists of two parts, a head group 62 and a tail group 64 (as shown in FIG. 2). The head group 62 of a typical surfactant is hydrophilic or lipophobic, which is water-loving or oil-hating. The head group 62 is an ionic or highly polar group. In contrast, the tail group 64 is water hating or oil loving, which is called hydrophobic or lipophilic. The tail group 64 is usually a long-chain hydrocarbon. Depending on the nature of the hydrophilic group, surfactants are classified into four types. Surfactants having a negative or positive charge on the hydrophilic group are called anionic or cationic, respectively. Surfactants with both a positive and negative charge are called zwitterionic. The last type consists of surfactant molecules with no apparent charge on the hydrophilic group. They are called nonionic surfactants.

Surfactant aggregation in solution has many forms. The most well known form is a micelle 70 as shown in FIG. 2. Micelles 70 are suspended in solution 80. Surfactants can also adsorb onto a surface 90 of a substrate 100 by means of electrostatic attraction. They can adsorb with or without aggregation. If the aggregation on the surface 90 of the substrate 100 consists of only one layer, it is called a hemimicelle 110. If it consists of two layers, it has been called an admicelle 120.

Figure 3:
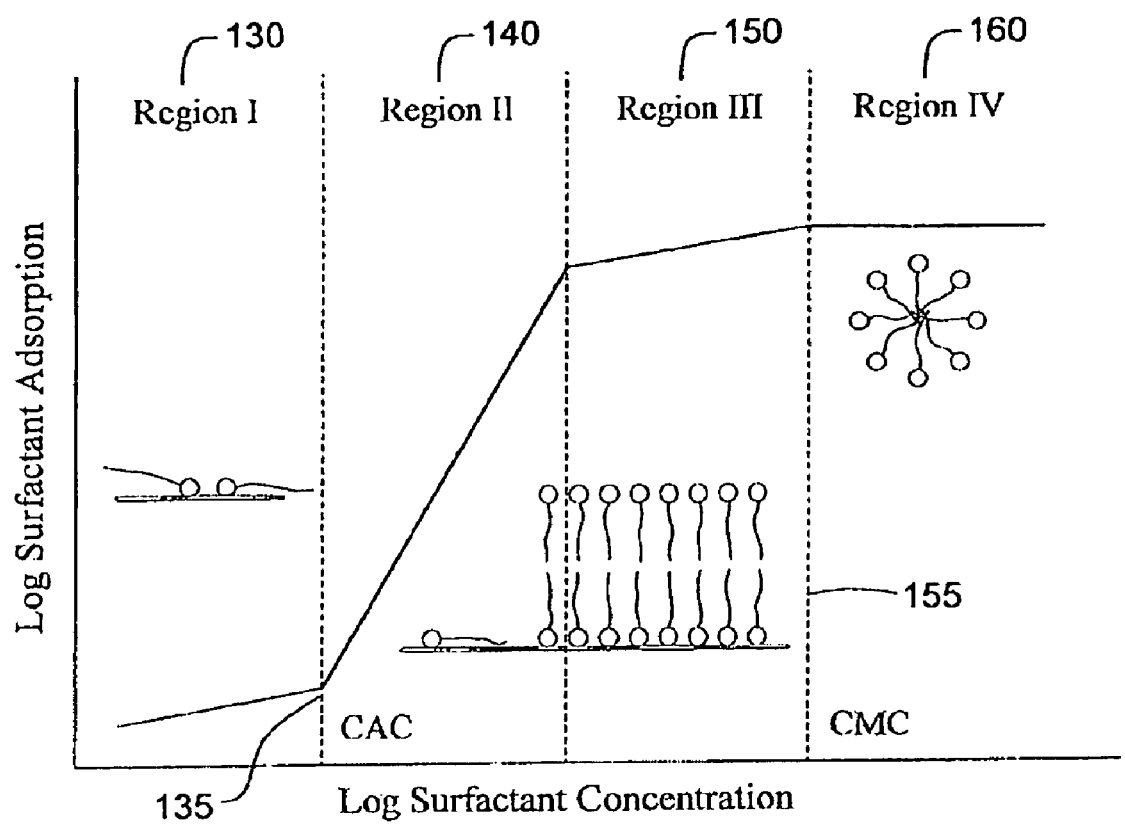
FIG. 3 is a graph view of an adsorption isotherm of a surfactant used in the present invention.

One parameter that determines the aggregation of surfactant is the surfactant concentration as shown in FIG. 3, an adsorption isotherm. The adsorption isotherm shown in FIG. 3 is the plot between log of surfactant concentration and log of surfactant adsorbed onto the surface 90 of the substrate 100. The adsorption isotherm shown in FIG. 3 can be divided into four regions. In Region I 130, the surfactant adsorbs onto the surface 90 mainly by ion exchange without aggregation. In Region II 140, there is a sharp increase in adsorption, resulting from interaction of the hydrophobic chains of oncoming surfactant with those of previously adsorbed surfactant. The concentration at which the isotherm moves from Region I 130 to Region II 140 is called the critical admicelle concentration (CAC) 135. In Region III 150 the slope of the isotherm is reduced because the surface of the substrate 100 is becoming saturated and, thus, further adsorption must overcome electrostatic repulsion between the oncoming surfactant and the similarly charged solid. In Region IV 160, any further increase in the surfactant concentration will lead to micelle formation in the solution 80 with no further adsorption on the substrate 100 and the isotherm remains constant. The concentration at which the isotherm moves from the Region III 150 to Region IV 160 is called the critical micelle concentration (CMC) 155.

Figure 4:
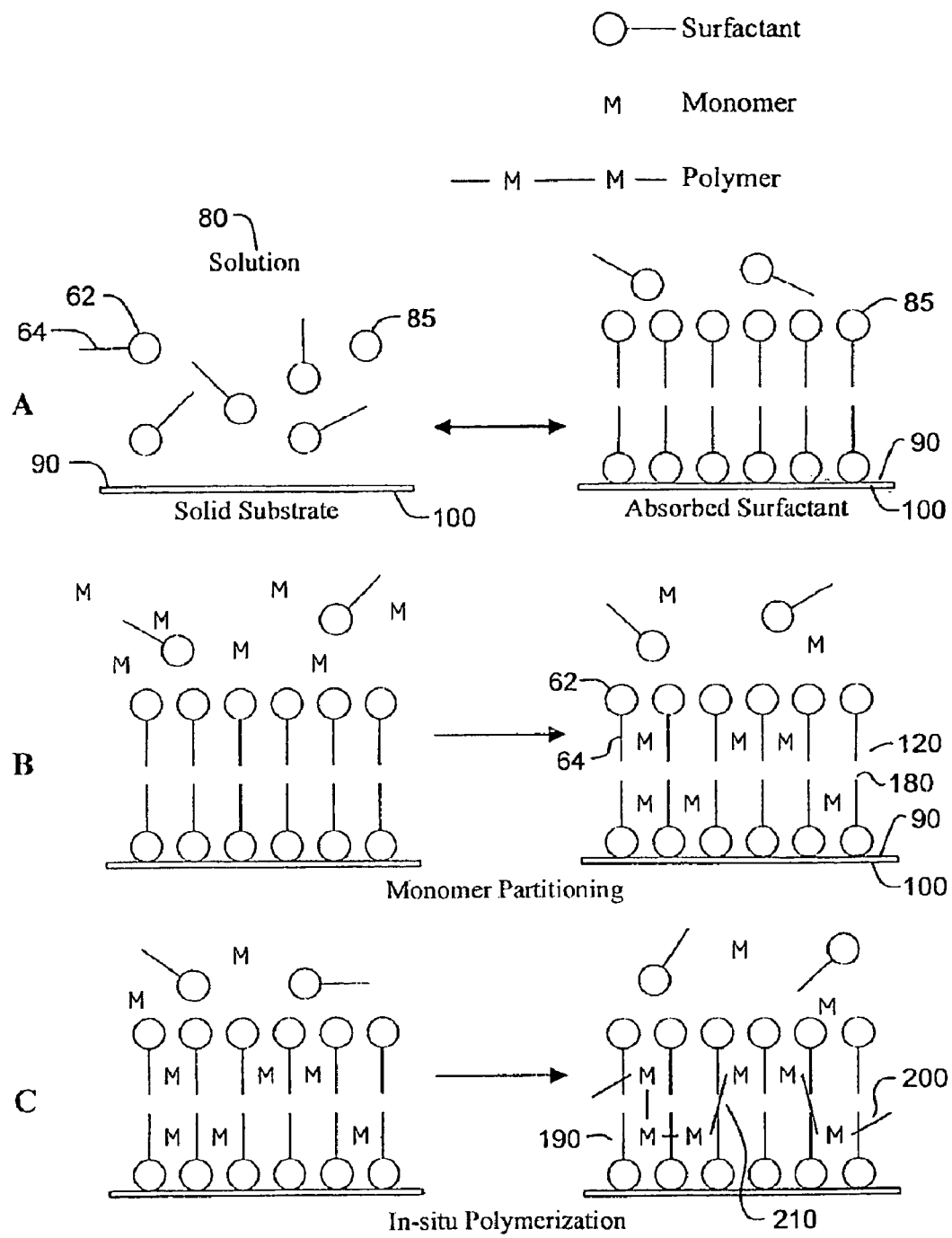
FIGS. 4 A-C are a diagrammatic representation of the steps of admicellic polymerization.

Admicellar polymerization consists of three main steps to produce a thin-film of polymer and is shown in FIGS. 4 A-C. Step 1, as shown in FIG. 4A, consists of admicelle 120 formation by adsorption of surfactant 85 from the aqueous solution 80 to the surface 90 of the substrate 100. The aggregation of surfactant 85 depends on several parameters. One parameter that determines the aggregation of surfactant 85 is surfactant concentration. The initial feed concentration of surfactant is generally chosen close to but below the critical micelle concentration (CMC) 155 to avoid emulsion polymerization in micelles 70 and to maximize admicelle 120 formation. The choice of surfactant is influenced by the point of zero charge (PZC) of the surface. The surface becomes positive at pH values below the PZC, but negative above the PZC. Consequently, anionic surfactants adsorb better below the PZC and cationic surfactants above the PZC. Thus, surfactant molecular structure also effects adsorption. The addition of salt reduces the repulsion between head groups 62 of the surfactants 85 and causes the surfactant molecules to come closer together.

Step 2, as shown in FIG. 4B, is the solubilization of a monomer 170 into the micelle 70. Step 2 is called adsolubilization. The monomers 170, which are nearly insoluble in water, diffuse from aqueous solution 80 and solubilize in the hydrophobic interior 180 of the admicelle 120. Formally, adsolubilization is defined as the excess concentration of a species at an interface in the presence of the admicelle 120 that would not exist in the absence of the admicelle 120.

Step 3, as shown in FIG. 4C, is the in situ polymerization of the monomer 170. Once an initiator 190 is added, the polymerization reaction starts in the admicelles 120, which act as a reaction site or a two-dimensional reaction solvent for polymerization. The polymerization mechanism is similar to those that occur in conventional emulsion techniques.

After the formation of a polymer, excess surfactant 85 may be removed by washing. This leaves a thin polymer film 210 exposed over the surface 90 of the substrate 100.

Figure 5:
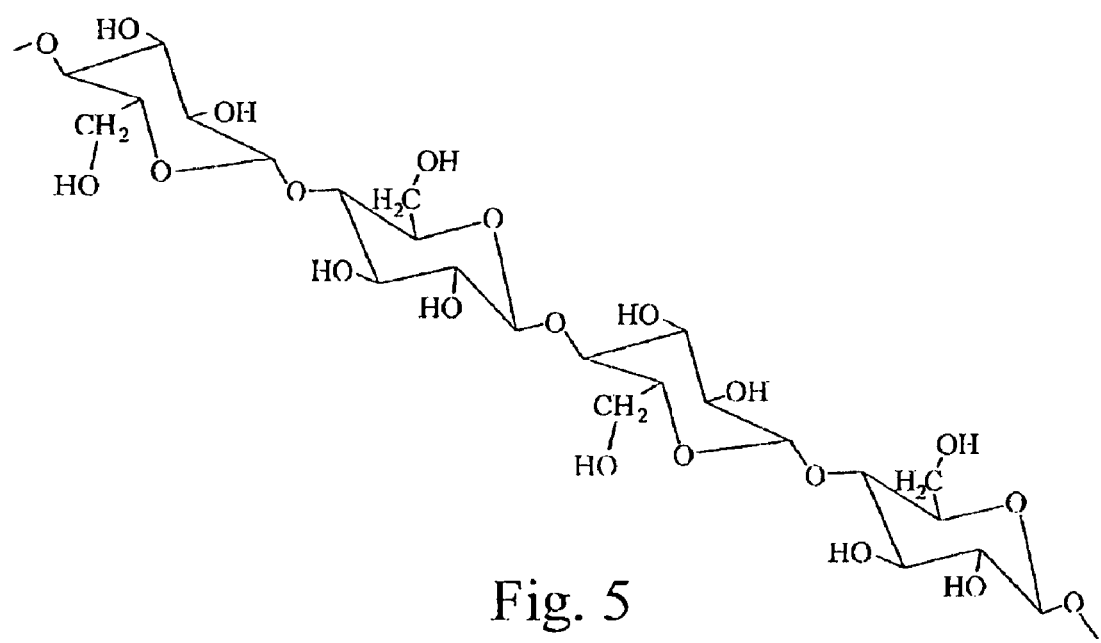
FIG. 5 is a diagrammatic representation of the chemical structure of cellulose.

Cotton is a natural fiber from the seeds of a plant in the genus Gossypium. It has an average diameter of 20 µm and an average length of 1-1.5 inches. In its natural state, cotton consists mainly of cellulose with about 10-20% other substances such as, wax, pectin, hemicellulose, seed husks, and others. Normally, these impurities have to be removed prior to the dyeing process to improve the wettability and uniformity of fabric properties. Cleaned cotton usually consists of over 99% cellulose. The cellulose molecules in cotton mainly gathered in bundles in the form of fibrils which spiral around the fiber surface. The molecular structure of cellulose is shown in FIG. 5.

Cellulose contains extensive hydroxyl groups making it highly hydrophilic in its raw form. In making cotton water resistant and/or water repellant, normally a film of wax, silicone, or fluorocarbon, is coated on the fabric. This conventional treatment process consists of padding the fabric in a solution containing waterproofing agent followed by drying. This results in a thick film on the coated fibers making the fabric stiff. Furthermore, the coating reduces air permeability of the fabric thus making it unsuitable for use as clothing. Cotton treated according to the methodology of the present invention becomes water resistant and/or water repellant without such disadvantages of the methodology known in the art.

Overview of the Process According to the Presently Disclosed and Claimed Invention Poly(perfluoroalkylethyl methacrylate) (PFMA) was applied to cotton fabric to obtain a hydrophobic/oleophobic surface by the admicellar polymerization technique. The increase in the hydrophobicity and oleophobicity of the treated fabric surface was evaluated by the drop test with water and oil, and water- and oil-repellency ratings were determined. The results show that satisfactory evenness of coating and repellency on fabric was obtained after 24 hr of polymerization. Water and oil repellency of the treated fabric increased with increasing monomer concentration in the range of 2.4-24.0 mM. At the FMA:DBSA (dodecylbenzenesulfonic acid) molar ratio of 6:1 (or FMA concentration of 7.2 mM), the treated fabric can resist wetting by both water and n-hexadecane droplets for longer than 30 min. Water contact angles of 136-151° and n-hexadecane contact angles of 121-127° were obtained.

Surface treatment of fibers to achieve water and oil repellency as a way to produce soil-resistant fabric has long been a subject of great interest. The wettability of a material is dependent on the chemical composition of the surface layer with surfaces having lower surface energy typically exhibiting poorer wetting. Many fabrics have been commercially treated with water- and oil-repellent agents for use in various fields such as rainwear, sports and leisure wear, curtains, upholstery fabrics, carpet goods, restaurant uniforms, and aprons.

Fluorinated polymers represent a well-known group of low surface energy materials having both hydrophobic and oleophobic character. A very low energy surface is obtained when the surface is uniformly coated with a trifluoromethyl ($-CF_3$) group. Various water-repellent agents containing fluoroalkyl compounds have been developed since 1950. These fluorine-based agents, which also show oil-repellency, do not affect the texture of the fibers because a small amount is very effective. For these reasons, the fluoroalkyl compounds remain the most important water- and oil-repellent treatments. Most of the fluoroalkyl compounds used for the above purposes are long-chain perfluoroalkyl-acrylate or methacrylate-based polymers, containing perfluoroalkyl groups ($R_f$ group: $-(CF_2CF_2)_nF$) e.g. poly(perfluoroalkylethyl acrylate) and poly(perfluoroalkylethyl methacrylate).

Various techniques have been used to deposit fluorocarbon compounds onto different kinds of fiber and textile to enhance oil and water repellency and also soil release property. Some of these methods, for example padding and dipping are the most common in treating the fabric. The use of admicellar polymerization to coat fluorocarbon compounds on fabrics, as disclosed and claimed herein, is a novel and non-obvious approach to produce articles (such as fabrics) that are hydrophobic and oleophobic.

Admicellar polymerization is a relatively new method for application of a thin film coating. In this method, a suitable monomer is induced to undergo a polymerization reaction in a surfactant bilayer adsorbed on the substrate surface. The polymerization is conducted in the liquid phase with no special equipment needed, while the monomer may be a gas, liquid, or solid. Because the reaction only occurs on the substrate surface, there is no risk of blocking the interstices between fibers and yarns; hence, good air permeability of the fabrics remains. As discussed hereinabove, the process of admicellar polymerization has been characterized as occurring in four distinct steps. In the first step, surfactants are adsorbed on the substrate surface to form a bilayer structure or admicelle. The surfactant concentration is chosen to be close or equal to the critical micelle concentration (CMC) to obtain maximum admicelle formation with no micelle in the solution to avoid emulsion polymerization. Admicelle formation is controlled by the electrochemical nature of the substrate, the type of surfactant molecule, the pH of solution, and added counterion. In step two, a known amount of monomer is added to the solution. Due to its hydrophobicity, the monomer will concentrate in the hydrophobic interior of the admicelle. Then the initiator is introduced into the solution to initiate the polymerization of the monomer in the admicelle to form the thin polymeric film on the surface substrate. In the final step, surfactant is removed by washing with water, exposing the polymer film on substrate.

As also discussed hereinabove, thin film coating by admicellar polymerization has been successfully prepared in various systems. Examples are poly(tetrafluoroethylene) on alumina, polystyrene on cotton, polystyrene on glass fibers, poly(methylmethacrylate) on cellulosic fibers and sodium styrene sulphonate on cotton. In one specific and particularly useful embodiment of the presently disclosed and claimed invention, cotton fabric was coated with poly(perfluoroalkylethyl methacrylate) by such an admicellar polymerization process thereby imparting hydrophobic and oleophobic characteristics to the material.

Materials

Perfluoroalkylethyl methacrylate (ZONYL™, Aldrich), which is abbreviated as FMA, was heated to 50° C. and stirred before use to ensure uniformity. 2,2'-Azobis (2-methylpropionamidine) dihydrochloride (97%, Aldrich) was used as the initiator. Dodecylbenzenesulfonic acid (DBSA), sodium salt, tech., used as the surfactant, was purchased from Aldrich. Methyl ethyl ketone, which is abbreviated as MEK, (Carlo Erba Reagenti) was used as received. Plain weave bleached cotton (fabric weight 165 g/sq.m) was washed several times in a washing machine at 95° C. until it was free from any remaining surfactant prior to use. Concentrated hydrochloric acid (37%) and sodium chloride were acquired from Carlo Erba Reagenti. Isopropanol was supplied by J. T. Baker, while paraffin oil (Nujol), n-Octane>99% and n-Heptane 99.7% all came from Carlo Erba Reagenti. Other alkanes which included n-Hexadecane 99%, tetradecane 99%, dodecane 99%, and decane 99+% were purchased from Acros Organics.

Admicellar Polymerization of Monomer on Fabric

Polymerization of FMA on cotton was carried out using 1.2 mM DBSA and 0.15M NaCl with the desired FMA:DBSA and FMA:V50 molar ratios. Solution of DBSA, NaCl and initiator were prepared using pH 4 distilled water (adjusted by using concentrated hydrochloric acid 37%) and a stock solution of 120 mM monomer was prepared using MEK. The stock solution was used to prepare monomer solutions of desired concentrations that covered the concentration range of 2.4-12.0 mM to give FMA:DBSA ratios in the range of 2:1, 4:1, 6:1, 8:1, to 10:1. FMA:V50 ratio of 1:1 was used. Polymerization time was varied from ½, 1, 2, 4, 5, 6, 8, 10 to 24 hr. The 5.5×5.5 cm$^2$ fabric was placed in a 24-mL vial containing 20 mL solution of DBSA, NaCl, monomer and initiator. The vial was then sealed with aluminium foil and the lid was screwed on and sealed with paraffin film. The vial was placed in the shaker bath at 30° C. for 15 hr, then the temperature was raised to 75° C. to initiate the polymerization. After polymerization, the fabric was taken out from the vial and washed in water at 80° C. for 30 min, 3 times to remove the outer layer of DBSA. Finally it was dried in the oven at 65° C. overnight.

Oleophobicity Testing

For evaluation of oleophobic properties of the treated fabrics, four drops of n-hexadecane, which is American Association of Textile Colorists and Chemists (ATTCC) oil test grade liquid No. 3 representing moderate oil repellency grade according to AATCC test method 118-1984, were placed on the inner surface of the fabric in different parts and three drops on the outer surface. The time required for the droplets to disappear from the surface of the fabric was measured up to a maximum of 30 min. The AATCC Oil Repellency: Hydrocarbon Resistance Test method 118-1984, with a scale from 0 (no oil repellency) to 8 (extremely high oil repellency), was applied to evaluate oil repellency rating. In this test, five pieces of 5.5×5.5 cm$^2$ treated cotton fabric were used for a set of testing. 0.05 mL of test liquid drops were placed on each test specimen and observed for 30±2 seconds. If three (or more) of the five drops applied show clear well-rounded drop or rounded drop with partial darkening of the fabric, the next higher-numbered test liquid drops were placed on the fabric and again observed for 30±2 seconds. Oil repellency rating of a fabric is the highest numbered test liquid that does not wet the fabric.

Hydrophobicity Testing

The hydrophobicity of the fabric was determined by placing five drops of water in different parts of the surface on both sides to observe the time for the water droplet to disappear up to a maximum of 30 min. Water repellency ratings were determined according to the scale given in 3M Water Repellency Test: Water/Alcohol Drop Test. This test was carried out with the same procedure and consideration as oil repellency rating evaluation. The repellency rating was given on a spectrum of 0 to 10, where 0 is pure water and 10 is pure isopropanol. The rating for the fabric was based on the most concentrated aqueous liquid that does not penetrate the fabric within a period of 30±2 seconds. Both oleophobicity and hydrophobicity tests were carried out with untreated and treated fabric. Test liquids were prepared and numbered according to Table 1.

TABLE 1

Standard test liquids for evaluation water and oil repellency

| Rating | Water repellency test liquid | Rating | Oil repellency test liquid |
|---|---|---|---|
| 0 | Pure water | 0 | None (Fails Nujol) |
| 1 | 10% IPA[1] | 1 | Nujol |
| 2 | 20% IPA | 2 | 65 vol % Nujol[2] |
| 3 | 30% IPA | 3 | n-hexadecane |
| 4 | 40% IPA | 4 | n-tetradecane |
| 5 | 50% IPA | 5 | n-dodecane |
| 6 | 60% IPA | 6 | n-decane |
| 7 | 70% IPA | 7 | n-octane |
| 8 | 80% IPA | 8 | n-heptane |
| 9 | 90% IPA | | |
| 10 | 100% IPA | | |

[1]Vol % isopropanol in distilled water
[2]In n-hexadecane

Contact Angle Measurement

Static contact angles with water and oil were measured for both front and back sides of the fabric at 30° C. using sessile drop method on a DSA10 contact angle measuring instrument (KRÜSS Gmbh Germany). For each sample, a total of ten drops of water and seven drops of n-hexadecane were placed on different parts of the sample on both sides. Contact angle at every 1 min was measured for a period of 5 min. The average value of all measurements was then calculated.

Surface Morphology of the Treated Fabric

Surface morphology of the treated fabric was studied by Joel SEM model ISM 2590+. Specimens were sampled at random from different fabric locations and sputter coated with gold prior to observation. Magnification used was in the range of 750-2000 times.

Effect of Polymerization Time

Effect of polymerization time on the hydrophobicity and oleophobicity of the treated fabrics was determined by varying polymerization time from ½, 1, 2, 4, 5, 6, 8, 10 to 24 hr using FMA:DBSA molar ratio of 10:1 and FMA:V50 molar ratio of 1:1. Table 2 compares the wetting time of water and oil of treated cotton at varying polymerization time. The results for untreated cotton were also presented which show that untreated cotton was completely and instantly wetted by both water and oil. The wetting time ranges indicated in Table 2 show the time taken for complete wetting by the first drop and for complete wetting by the last drop of the test liquids on each test specimen.

TABLE 2

Time required for test liquids to penetrate treated cotton fabric at different polymerization times

| | Time (min:sec) | |
|---|---|---|
| Polymerization time (hr) | Water | n-Hexadecane |
| Untreated cotton | 0:00 | 0:00 |
| ½ | 0:00 | 0:08-0:18 |
| 1 | 0:05-0:08 | 0:30-0:58 |
| 2 | 0:14-0:45 | 0:38-1:12 |
| 4 | 0:28-2:16 | 0:50-2:24 |
| 5 | 1:30-NP(2) | 1:48->30(2) |
| 6 | 3:40-NP(6) | 4:48->30(5) |
| 8 | 3:07-NP(6) | 4:48-NP(1) |
| 10 | NP | 21:00-NP(6) |
| 24 | NP | NP |

NP—no penetration or wetting of fabric by test droplets throughout the test period of 30 min.
( )Number of positions on fabric that is not wetted in one sample.

In instances where no penetration or wetting of the fabric by the test liquid droplets occurred during the observation period, the wetting time is labelled as "no penetration or NP." Where penetration without complete disappearance of the droplet occurred during 30 min, the wetting time is labelled as being "greater than 30 min."

The results in Table 2 show that the longer the polymerization time, the better the evenness of coating and the repellency to test liquids of treated cotton fabrics. At the polymerization time of ½ hr, the treated fabrics were non-repellent and there was little improvement when the polymerization time was extended to 1 to 4 hr. After the polymerization time of 5 hr, the repellency of treated fabrics increased rapidly until the polymerization time of 24 hr when fully hydrophobic and oleophobic cotton was achieved. Therefore, in order to obtain satisfactory evenness of coating and repellency on cotton fabrics, the polymerization time was chosen to be 24 hr.

Effect of Monomer Concentration

In this work DBSA concentration, NaCl concentration and the FMA:V50 molar ratio were fixed at 1.2 mM, 0.15 M and 1:1, respectively. After adsorption and adsolubilization for 15 hr, the temperature was raised to 75° C. and polymerization reaction was carried out for 24 hr. Effect of FMA monomer concentration on the repellency of the cotton fabric was investigated by varying FMA concentration from 2.4-12 mM to give a FMA:DBSA molar ratio in the range 2:1-10:1.

The results in Table 3 show that higher amount of monomer added enhanced the evenness of coating as can be seen in the decrease in the difference between the time taken for complete wetting by the first and the last drops of test liquid. Water and oil repellency of the treated fabric increased with increasing monomer concentration. At a FMA:DBSA ratio of 2:1, little improvement in the hydrophobicity of treated cotton fabric was observed in comparison with untreated cotton. For a FMA:DBSA ratio of 4:1, some penetration without complete disappearance of droplets occurred whereas at the ratio of 6:1 to 8:1, all the water droplets remained on the fabric after 30 min. Some of these water droplets still showed slight penetration. Fully hydrophobic cotton was obtained at a ratio of 10:1. In case of oil repellency, some oil drops remained on the fabric without penetration even at a FMA:DBSA ratio of 2:1 but fully oleophobic cotton was achieved from a ratio of 6:1. The results show that, at the same amount of FMA coating, cotton fabric showed better oil repellency than water repellency.

TABLE 3

Time required for test liquids to penetrate treated
cotton fabric with different monomer concentrations

| | Time (min:sec) | |
|---|---|---|
| FMA:DBSA molar ratio | Water | n-Hexadecane |
| 2:1 | 1:12-5:24 | 22:12-NP(3) |
| 4:1 | 12:00->30(7) | >30-NP(3) |
| 6:1 | >30-NP(7) | NP |
| 8:1 | >30-NP(8) | NP |
| 10:1 | NP | NP |
| 15:1 | NP | NP |
| 20:1 | NP | NP |

NP—no penetration or wetting of fabric by test droplets throughout the test period of 30 min.
( )Number of positions on fabric that is not wetted in one sample.

In addition, SEM micrographs of treated fiber surface shown in FIG. 3 show that each individual fiber of coated fabric was covered with a thin film of PFMA produced by admicellar polymerization. At high monomer concentration, there were also some PFMA particle depositions. These particles may come from solution polymerization of the monomer and initiator in the aqueous phase. The SEM micrographs confirm that PFMA was successfully coated on the fiber surface by admicellar polymerization.

Effect of Coating Methodology

As shown in Table 4, at the same FMA:DBSA ratio, water and oil repellency of treated cotton obtained from adapted process was better than that of the samples obtained from standard process except at a FMA:DBSA ratio of 10:1, water repellency of treated cotton obtained from both processes was the same. According to SEM micrographs (FIG. 6), combining adsorption with adsolubilization step facilitates monomer adsolubilization (more monomer concentrated in the admicelle) resulting in more even polymer film formed on the fabric. In case of cotton fabric treated by solution polymerization, fully hydrophobic/oleophobic cotton was achieved from a FMA:DBSA ratio of 4:1 showing that PFMA particles from solution polymerization can deposit well on the cotton fabric. The results show that, the repellency of solution polymerization treated cotton was better than admicellar polymerization samples because solution polymerization samples were not washed as in the case of admicellar polymerization samples and some PFMA may have been removed during the washing step. In addition, SEM micrographs of treated fiber surface in FIG. 6 show that solution polymerization coated fabric was covered with a thick layer of PFMA particles and the coating was uneven whereas each individual fiber of coated fabric by admicellar polymerization was covered with a thin film of PFMA and the coating was more even.

TABLE 4

Time required for test liquids to penetrate treated cotton with different coating procedures

| | Time (min:sec) | | | | | |
|---|---|---|---|---|---|---|
| | Water | | | n-Hexadecane | | |
| FMA:DBSA molar ratio | Adapted process | Standard process | Solution polymerization | Adapted process | Standard process | Solution polymerization |
| 2:1 | 1:12-5:24 | 1:15-2:14 | 7.2-NP(2) | 22:12-NP(3) | >30-NP(3) | 3:40-NP(1) |
| 4:1 | 12:00->30(7) | 3:14-NP(1) | NP | >30-NP(3) | >30-NP(4) | NP |
| 6:1 | >30-NP(7) | 6:10-NP(5) | NP | NP | 27:12-NP(4) | NP |
| 8:1 | >30-NP(8) | 6:41-NP(8) | NP | NP | >30-NP(4) | NP |
| 10:1 | NP | NP | NP | NP | >30-NP(5) | NP |

NP—no penetration or wetting of fabric by test droplets throughout the test period of 30 min.
( )Number of positions on fabric that is not wetted in one sample.

A standard admicellar polymerization process, which is a four-step process consisting of admicelle formation, monomer adsolubilization, polymerization and surfactant removal, has been adapted for PFMA coating. Since FMA is an oil-soluble monomer, it helps to dissolve them separately in methyl ethyl ketone (MEK) before adding to the surfactant solution. In order to save time and facilitate monomer adsolubilization, the monomer can be added at admicelle formation step to perform admicelle formation and monomer adsolubilization concurrently.

Effect of coating procedure on the repellency and surface morphology of treated cotton fabric was investigated by using two types of admicellar polymerization process; (1) standard process (4-step), (2) adapted process (3-step), and solution polymerization. The FMA concentration was varied from 2.4-12 mM to give a FMA:DBSA ratio in the range of 2:1-10:1. Solution polymerization of FMA on cotton was carried out in the same way as admicellar polymerization but only monomer and initiator were added with no surfactant and the washing step was not done. Standard admicellar polymerization was also conducted as described in admicellar polymerization of monomer on fabric section but the combined adsorption/adsolubilization step was separated and both steps were set for a period of 15 hr each.

Contact Angles of Water and Oil (N-Hexadecane) Drops on Treated Fabric Surface

Figure 7:
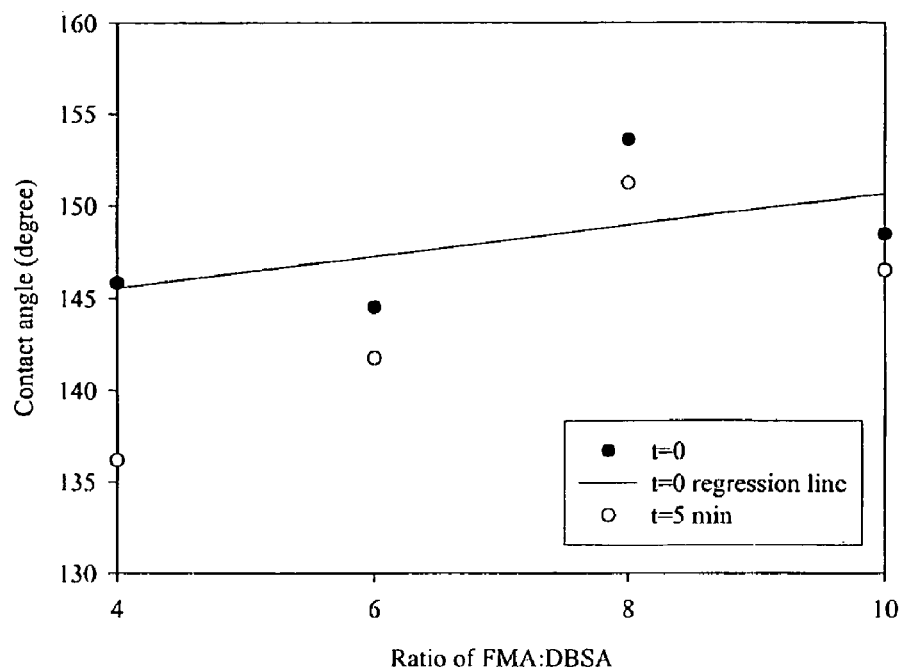
FIG. 7 is a graphical representation of contract angles of water drops on treated cotton fabric at varying monomer concentration.
Figure 8:
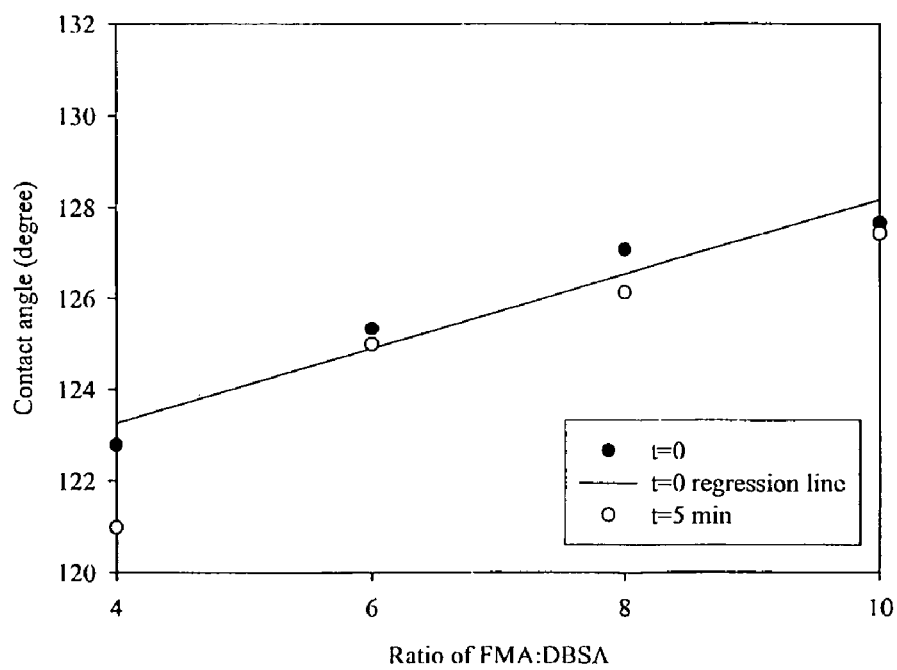
FIG. 8 is a graphical representation of contract angles of n-hexadecane drops on treated cotton fabric at varying monomer concentration.

Contact angles of both water and oil droplets on treated cotton surface were measured at varying monomer concentration. As shown in FIGS. 7 and 8, when greater amount of monomer was charged to the reactor, the contact angle of water and oil drops increased corresponding to the improvement in the hydrophobicity and oleophobicity of treated cotton fabric. After 5 min, contact angle of both test liquids decreased a little at the low concentrations of monomer but stayed nearly the same at high concentrations of monomer. Contact angles of all water droplets on treated cotton fabric are greater than 135° whereas contact angles of n-hexadecane droplets are greater than 120° showing the excellent water and oil repellency of treated cotton. For homo-PFMA, water contact angle of 113.6° was previously observed in the literature. The results show that in the present work, higher contact angles were obtained on treated fabric surface. Similar results were also reported by Sherman et al. (1969) for a fluorochemical finishing cotton, polyester, and polyester/cotton blend fabrics treated by a padding process.

Water- and Oil-Repellency Rating

According to the drop test results, the cotton fabric treated according to the presently disclosed and claimed methodology can resist wetting by both water and oil (n-hexadecane) droplets for longer than 30 min from a FMA:DBSA ratio of 6:1 so treated cotton at a ratio of 6:1, 8:1, and 10:1 were selected to evaluate their water- and oil-repellency rating.

The ratings of water and oil repellency tests reported in Table 5 are in good agreement with the wetting time results discussed with respect to the effect of monomer concentration hereinabove. All samples obtained high water-repellency rating (6 to 7 rating) and moderate oil-repellency rating (3 rating). Water- and oil-repellency ratings of other fluorocarbon-treated fabrics were also determined by other authors. Cotton fabric coated with commercial water borne fluorinated resin by pad-cure method has a water-repellency rating of 5 and an oil repellency rating of 4. Cotton fabric coated with polymer having the polyfluoro-octyl side chain obtained a rating of 3 for both water and oil repellency.

TABLE 5

Water-and oil-repellency ratings determined for untreated and treated cotton fabrics with different monomer concentrations

| DBSA:FMA molar ratio | Water-repellency rating | Oil-repellency rating |
|---|---|---|
| Untreated | 0 | 0 |
| 1:6 | 6 | 3 |
| 1:8 | 6 | 3 |
| 1:10 | 7 | 3 |

Water-repellency rating scale is 0-10
Oil-repellency rating scale is 0-8

Satisfactory evenness of coating and repellency to both water and oil on fabric was obtained at 24 hr of polymerization. An increase in monomer concentration resulted in higher hydrophobicity and oleophobicity of treated fabric as shown by drop test and contact angle measurements. At the FMA:DBSA molar ratio of 6:1 (or FMA concentration of 7.2 mM), the treated fabric can resist wetting by both water and n-hexadecane droplets for longer than 30 min whereas water-repellency rating of 6 and oil-repellency rating of 3 were obtained. In the presently disclosed and claimed methodology, combining adsorption with adsolubilization step was found to be the way to save time and facilitate monomer adsolubilization resulting in more even PFMA film on the fabric. Water contact angles of 136-153° and n-hexadecane contact angles of 121-130° were obtained showing the excellent repellency properties of treated cotton. SEM micrographs of the treated surface show film-like coating of PFMA together with PFMA particles deposition that increases with increase in monomer concentration. The presently claimed and disclosed methodology is useful for polymer formation by admicellar polymerization that is capable of producing cotton and polyester fabrics with good water- and oil-repellency properties.

Thus, in accordance with the present invention, there has been provided a method for making an article, such as cloth or wool, water repellent and/or waterproof and oil repellent and/or oil proof that fully satisfies the objectives and advantages set forth above. Although the invention has been described in conjunction with the specific drawings and language set forth above, it is evident that many alternatives, modifications, and variations will be apparent to those skilled in the art. Accordingly, it is intended to embrace all such alternatives, modifications and variations that fall within the spirit and broad scope of the invention.

REFERENCES

The following references, to the extent that they provide exemplary procedural or other details supplementary to those set forth herein, are specifically incorporated herein by reference in their entirety as though set forth herein particular.

1. American Association of Textile Chemists and Colorists. (1996). *AATCC Technical Manual*. NC: Research Triangle Part.
2. Boufi, S., and Gandini, A. (2001). Formation of polymeric films on cellulosic surfaces by admicellar polymerization. *Cellulose*, 8(4), 303-312.
3. Castelvetro, V., Francini, G., Ciardelli, G., and Ceccato, M. (2001). Evaluating fluorinated acrylic latices as textile water and oil repellent finishes. *Textile Research Journal*, 71(5), 399-406.
4. Crews, P. C., Rich, W., and Kachman, S. D. (1995). Effect of fiber content, fabric construction and cleaning on the performance of fluorochemically-finished fabrics. *Textile Chemist and Colorist*, 27(11), 21-26.
5. Katano, Y., Tomono, H., and Nakajima, T. (1994). Surface property of polymer films with fluoroalkyl side chains. *Macromolecules*, 27(8), 2342-2344.
6. Lai, C., Harwell, J. H., O'Rear, E. A., and Hwa, M. J. (1997). Adsolubilization of fluorocarbon alcohols into perfluoroheptanoate admicelles formed on alumina. *Langmuir*, 13(16), 4267-4272.
7. Lai, C., Harwell, J. H., O'Rear, E. A., Komatsuzaki, S., Arai, J., Nakakawaji, T., and Ito, Y. (1995). Formation of poly(tetrafluoroethylene) thin films on alumina by admicellar polymerization. *Langmuir*, 11(3), 905-911.
8. Linemann, R., Gorenberg, A., Bar, G., Cantow, H., and Mülhaupt, R. (1997). Synthesis of fluorene-containing dispersions and an Environmental Scanning Electron Microscope analysis of their morphology when applied to cotton fabrics. *Journal of Coatings Technology*, 69(871), 77-81.
9. O'Haver, J. H., Harwell, J. H., O'Rear, E. A., Snodgrass, L. J., and Waddell, W. H. (1994). In situ formation of polystyrene in adsorbed surfactant bilayers on precipitated silica. *Langmuir*, 10(8), 2588-2593.
10. Park, J. I., Lee, S., and Choi, K. C. (1994). Surface properties for poly(perfluoroalkylethyl methacrylate)/poly (n-alkyl methacrylate)s mixtures. *Journal of Applied Polymer Science*, 54(10), 1449-1454.
11. Philips, F. J., Segal, L., and Loeb, L. (1957). The application of fluorochemicals to cotton fabrics to obtain oil and water repellent surfaces. *Textile Research Journal*, 27(5), 369-378.
12. Pisuntornsug, C., Yanumet, N., and O'Rear, E. A. (2002). Surface modification to improve dyeing of cotton fabric with a cationic dye. *Coloration Technology*, 118, 64-68.
13. Pittman, A. G., Sharp, D. L., and Ludwig, B. A. (1968). Polymers derived from fluoroketones. II. wetting properties of fluoroalkyl acrylates and methacrylates. *Journal of Polymer Science: Part A-1*, 6(6), 1729-1740.
14. Pongprayoon, T., Yanumet, N., and O'Rear, E. A. (2002). Admicellar polymerization of styrene on cotton. *Journal of Colloid and Interface Science*, 249, 227-234.
15. Rosen, M. J. (1989). *Surfactants and Interfacial Phenomena*. New York: John Wiley & Sons.
16. Sakhalkar, S. S., and Hirt, D. E. (1995). Admicellar polymerization of polystyrene on glass fiber. *Langmuir*, 11(9), 3369-3373.
17. Sherman, P. O., Smith, S., and Johannessen, B. (1969). Textile characteristics affecting the release of soil during laundering part II: fluorochemical soil-release textile finishes. *Textile Research Journal*, 39(5), 449-459.
18. Thomas, R. R., Anton, R. D., Graham, F. W., Darmon, J. M., Sauer, B. B., Stika, M. K., and Swartzfager, G. D.

(1997). Preparation and surface properties of acrylic polymers containing fluorinated monomers. *Macromolecules*, 30(10), 2883-2890.

19. Timperley, M. C., Arbon, E. R., Bird, M., Brewer, A. S., Parry, W. M., Sellers, J. D., and Willis, R. C. (2003). Bis (fluoroalkyl)acrylic and methacrylic phosphate monomers, their polymers and some of their properties. *Journal of Fluorine Chemistry*, 121, 23-31.

We claim:

1. Method for providing a sheet of material having a hydrophobic and oleophobic polymer coating on at least one surface thereof, the method comprising the steps of:
    providing a sheet of material having a first surface and a second surface, the first surface and the second surface having a plurality of individual fibers, each of the individual fibers having at least one surface;
    providing an aqueous hydrophobic and oleophobic coating composition having a critical micelle concentration, the aqueous hydrophobic and oleophobic coating composition containing a surfactant and a hydrophobic and oleophobic polymer consisting of one monomer, the surfactant having a hydrophilic head group, a hydrophobic tail group and a concentration less than the critical micelle concentration;
    providing an initiator;
    coating at least one of the first and second surfaces of the sheet of material with the aqueous hydrophobic and oleophobic coating composition; and
    introducing the initiator into the aqueous hydrophobic and oleophobic coating composition on the at least one of the first and second surfaces of the sheet of material to initiate the polymerization of the hydrophobic and oleophobic coating composition disposed on the at least one of the first and second surfaces of the sheet of material so that a hydrophobic and oleophobic polymer coating forms on at least one surface of the sheet of material.

2. The method of claim 1, wherein the sheet of material is selected from the group consisting of cloth, cotton, wool, burlap, natural polymer films, synthetic polymer films, polyesters, paper, cardboard and combinations thereof.

3. The method of claim 1, wherein the surfactant is selected from the group consisting of sodium dodecyl sulfate, linear alkyl benzene sulfonate, dodecylbenzenesulfonic acid and combinations thereof.

4. The method of claim 1, wherein the monomer of the hydrophobic and oleophobic polymer is a monomer of a fluorinated polymer.

5. The method of claim 4, wherein the fluorinated polymer is perfluoroalkylethyl methacrylate.

6. The method of claim 1, wherein the initiator is sodium persulfate.

7. The method of claim 1, wherein the initiator is azobisisobutyronitrile.

8. The method of claim 1, wherein the initiator is 2,2'-Azobis (2-methylpropionamidine) dihydrochloride.

9. The method of claim 1, wherein the first surface and the second surface comprise a plurality of individual fibers, each of the individual fibers having at least one surface.

10. A method of making a sheet of material having a hydrophobic and oleophobic polymer coating on at least one surface thereof, comprising:
    providing a sheet of material having a first surface and a second surface, the first surface and the second surface having a plurality of individual fibers, each of the individual fibers having at least one surface;
    introducing an aqueous hydrophobic and oleophobic coating composition having a critical micelle concentration, the aqueous hydrophobic and oleophobic coating composition containing a surfactant and a hydrophobic and oleophobic polymer consisting of one monomer on the at least one surface of the plurality of individual fibers to form the hydrophobic and oleophobic polymer coating, the surfactant having a hydrophilic head group, a hydrophobic tail group and a concentration less than the critical micelle concentration; and
    introducing an initiator to the aqueous hydrophobic and oleophobic coating composition disposed on the at least one surface of the plurality of individual fibers to form a hydrophobic and oleophobic polymer coating on the at least one surface of the plurality of individual fibers, wherein voids disposed between the plurality of individual fibers having the hydrophobic and oleophobic polymer coating on the at least one surface are free of the hydrophobic and oleophobic polymer coating.

11. The method of claim 10 further comprising:
    initiating a polymerization reaction on the at least one surface of the plurality of individual fibers coated with the aqueous hydrophobic coating composition.

12. The method of claim 10, wherein the sheet of material is selected from the group consisting of cloth, cotton, wool, burlap, natural polymer films, synthetic polymer films, polyesters, paper, cardboard and combinations thereof.

13. The method of claim 10, wherein the surfactant is selected from the group consisting of sodium dodecyl sulfate, linear alkyl benzene sulfonate, dodecylbenzenesulfonic acid and combinations thereof.

14. The method of claim 10, wherein the monomer of the hydrophobic and oleophobic polymer is a monomer of a fluorinated polymer.

15. The method of claim 14, wherein the fluorinated polymer is perfluoroalkylethyl methacrylate.

16. The method of claim 10, wherein the initiator is sodium persulfate.

17. The method of claim 10, wherein the initiator is azobisisobutyronitrile.

18. The method of claim 10, wherein the initiator is 2,2'-Azobis (2-methylpropionamidine) dihydrochloride.

19. The method of claim 10, wherein the plurality of individual fibers comprise natural fibers.

20. The method of claim 10, wherein the plurality of individual fibers comprise synthetic fibers.

* * * * *